United States Patent
Berg et al.

(10) Patent No.: US 6,891,621 B2
(45) Date of Patent: May 10, 2005

(54) HIGHLY SENSITIVE CROSS AXIS ACCELEROMETER

(75) Inventors: Arne Berg, Wattem (NO); Sverre Knudsen, Trondheim (NO)

(73) Assignee: Weatherford/Lamb, Inc., Houston, TX (US)

( * ) Notice: Subject to any disclaimer, the term of this patent is extended or adjusted under 35 U.S.C. 154(b) by 341 days.

(21) Appl. No.: 10/068,266

(22) Filed: Feb. 6, 2002

(65) Prior Publication Data

US 2002/0180978 A1 Dec. 5, 2002

Related U.S. Application Data

(60) Provisional application No. 60/266,667, filed on Feb. 6, 2001.

(51) Int. Cl.[7] .............................. G01B 9/02; G01P 15/13; G01P 15/00

(52) U.S. Cl. .................... 356/477; 356/478; 73/514.27; 73/514.38

(58) Field of Search .................. 356/477, 482, 356/478; 73/514.26, 514.27, 514.38, 514.01; 250/227.19, 227.27; 385/13

(56) References Cited

U.S. PATENT DOCUMENTS

| | | |
|---|---|---|
| 3,731,542 A | 5/1973 | Forsberg |
| 4,322,829 A | 3/1982 | Davis, Jr. et al. |
| 4,493,212 A | 1/1985 | Nelson |
| 4,567,771 A | 2/1986 | Nelson et al. |
| 4,589,285 A | 5/1986 | Savit |
| 4,719,800 A | 1/1988 | Moser |
| 4,893,930 A | 1/1990 | Garrett et al. |
| 5,001,337 A | 3/1991 | Homuth |
| 5,132,529 A | 7/1992 | Weiss |
| 5,237,632 A | 8/1993 | Henning |
| 5,276,322 A | 1/1994 | Carome |
| 5,369,485 A | 11/1994 | Hofler et al. |
| 5,390,155 A | 2/1995 | Lea |
| 5,437,186 A | 8/1995 | Tschulena |
| 5,497,233 A | 3/1996 | Meyer |
| 5,864,099 A | 1/1999 | Wittrisch et al. |

(Continued)

FOREIGN PATENT DOCUMENTS

| | | |
|---|---|---|
| DE | 199 39 583 A1 | 9/2000 |
| EP | 0 419 173 A1 | 3/1991 |
| WO | WO 98/35208 | 8/1998 |
| WO | WO 99/39214 | 8/1999 |

OTHER PUBLICATIONS

"Fibre–optic accelerometer for use in hostile electrical environments" by M. Cochard and G. S. Pritchard, pp. 40–43, Issue Four 1998, Hydropower & Dams.
International Search Report for PCT/US00/26331 (PCT case corresponding to related application).
Written Opinion for PCT/US00/26331 (PCT case corresponding to related applicaton).
International Search Report for corresponding PCT application No. PCT/GB02/00510.

Primary Examiner—Samuel A. Turner
Assistant Examiner—Patrick Connolly
(74) Attorney, Agent, or Firm—Moser, Patterson & Sheridan, L.L.P.

(57) ABSTRACT

A highly sensitive accelerometer for determining the acceleration of a structure includes a mass within a housing rotationally supported by a hinge and opposing support members. The support members are alternately wound around a fixed mandrel and the mass in a pendulum arrangement. At least a portion of one of the support members comprises a transducer capable measuring the rotation of the mass within the housing. An embodiment of the invention employs optical fiber coils as support members for use in interferometric sensing processes. Arrays of such interferometer based accelerometers maybe multiplexed using WDM or similar methods.

41 Claims, 10 Drawing Sheets

U.S. PATENT DOCUMENTS

| | | |
|---|---|---|
| 5,883,308 A | 3/1999 | Fersht |
| 5,892,860 A | 4/1999 | Maron et al. |
| 5,903,349 A | 5/1999 | Vohra et al. |
| 5,911,158 A | 6/1999 | Henderson et al. |
| 6,072,567 A | 6/2000 | Sapack |
| 6,161,433 A | 12/2000 | Erath |
| 6,175,108 B1 | 1/2001 | Jones et al. |
| 6,575,033 B1 * | 6/2003 | Knudsen et al. ......... 73/514.26 |

* cited by examiner

HIGHLY SENSITIVE CROSS AXIS ACCELEROMETER

CROSS REFERENCE TO RELATED APPLICATIONS

This application claims the benefit of U.S. Provisional Patent Application Ser. No. 60/266,667, filed on Feb. 6, 2001 and having the same title and naming the same inventors as this application, which is hereby incorporated by reference in its entirety.

TECHNICAL FIELD

This invention relates to highly sensitive accelerometers, and more particularly to a fiber optic based accelerometer.

BACKGROUND ART

It is known to monitor the physical characteristics of structures and bodies using sensors. One such application is the monitoring of oil wells to extract such information as temperature, pressure, fluid flow, seismic and other physical characteristics. The monitoring of oil wells presents certain challenges for conventional sensors because of the harsh environment in terms of high pressures and temperatures. Historically the monitoring of oil wells has been dominated by the use of electronic sensors with optical sensors being used to a lesser degree.

The presently used electronic sensors are limited for several reasons. First, the on-board electronics of such sensors must operate in a very hostile environment, which includes high temperature, high vibration and high external hydrostatic pressure. Second, electronics' inherent complexity renders them prone to many different modes of failure. Because early failure of the sensors results in time-consuming and expensive well intervention, such failures have traditionally caused a less than acceptable level of reliability when electronic sensors are used to monitor oil wells.

There are numerous other problems associated with the transmission of electrical signals within well bores. It is extremely difficult to seal the required insulated cables against exposure to well bore fluids, which are at high temperatures, high pressures, and are very corrosive. Electrical conductors damaged by the fluids that penetrate the insulating materials around the electrical conductors will typically short-circuit the electrical signals. Additionally, electrical transmissions are subject to electromagnetic interference in many production operations.

Accelerometers are used to measure down-hole seismic disturbances to determine the acoustic wave characteristics of underground layers in proximity of the well bore. An accelerometer may be considered as a mass-spring transducer housed in a sensor case with the sensor case coupled to a moving body, the motion of which is inferred from relative motion between the mass and the sensor case. Such accelerometers may be analyzed by considering the relative displacement of the mass as being directly related to the acceleration of the case and therefore to the acceleration of the earth in proximity to the well bore. An array of accelerometers may be placed along the length of a well bore to determine a time-dependent seismic profile.

One prior art accelerometer is a piezoelectric-based electronic accelerometer. Piezoelectric accelerometers typically suffer from the above-identified problems common to electronic sensors. Additionally, most high performance piezoelectric accelerometers require power at the sensor head. Also, multiplexing of a large number of sensors is cumbersome and tends to incur significant increases in weight and volume with a decrease in reliability.

It is also known to use optical interferometers for the measurement of acceleration of certain structures. It is also well known that fiber optic interferometric accelerometers can be designed with high responsiveness and reasonably low detection thresholds. Some prior art fiber optic accelerometers include interferometric fiber optic accelerometers based on linear and nonlinear transduction mechanisms, circular flexible disks, rubber mandrels and liquid-filled-mandrels. Some of these fiber optic accelerometers have displayed very high acceleration sensitivity (up to $10^4$ radians/g), but tend to utilize a sensor design that is impractical for many applications. For example, sensors with a very high sensitivity typically have a seismic mass greater than 500 grams, which seriously limits the frequency range in which the device may be operated. Additionally, these devices are so bulky that their weight and size renders them useless in many applications. Other fiber optic accelerometers suffer from high cross-axis sensitivity, low resonant frequency. Many fiber optic accelerometers require an ac dither signal or tend to be bulky (>10 kg), expensive and require extensive wiring and electronics. Even optical interferometers designed of special material or construction are subject to inaccuracies because of the harsh borehole environment and because of the very tight tolerances in such precision equipment.

For many applications, it is desirable that the fiber optic sensor is expected to have a flat frequency response up to several kHz (i.e., the device must have high resonant frequency). It is also desirable that the devices have high sensitivity, immunity from extraneous parameters (e.g., dynamic pressure). Finally, it is also desirable that the devices have a small foot print and packaged volume that is easily configured in an array (i.e., easy multiplexing).

SUMMARY OF THE INVENTION

The present invention is generally directed to a fiber optic accelerometer that may be used within a harsh environment (i.e., high temperature, pressure, shock and/or vibration) such as oil and/or gas wells, engines, combustion chambers, etc.

One embodiment includes an all glass fiber optic sensor capable of operating at high pressures (>15 kpsi) and high temperatures (>150° C.). A fiber optic accelerometer in accordance with the present invention will also work equally well in other applications.

One embodiment of the present invention includes a highly sensitive linear accelerometer for sensing acceleration in a predetermined direction perpendicular to the longitudinal axis of the sensor, i.e., a cross-axis accelerometer. Such an accelerometer may be comprised of a rigid housing having a mass suspended therein by at least one hinge at the end of the mass and at least two elastic support members that are axially aligned along the longitudinal axis and attached to one end of the housing and attached to the mass. At least a portion of one of the elastic support members comprises a transducer capable of measuring a rotation of the mass within the housing in response to acceleration along a predetermined direction perpendicular to the sensor axis. Certain embodiments include at least one fixed mandrel rigidly attached to the end of the housing. The mass comprises at least one floating mandrel. The elastic support members are each wrapped around one of the fixed mandrels and the floating mandrel. The mass rotates about the hinge within the housing.

The present invention is also directed to a linear accelerometer wherein at least one of the elastic support members comprises an optical fiber disposed such that movement of the mass changes the fiber length, which may be measured interferometrically.

Another aspect of the present invention includes a linear accelerometer having a cross-axis alignment assembly attached to the mass. The alignment assembly comprises at least one flexure member attached to the mass and the housing allowing movement of the mass in the predetermined direction and limiting movement of the mass in the two other directions. In one embodiment of the present invention, a pair of alignment assemblies are employed wherein the flexure member is a diaphragm positioned on an alignment rod. The diaphragm is captured within a bore in the housing about their outer periphery.

The present invention is also directed to a linear accelerometer wherein the transducer comprises a strain sensing element including a fiber optic strain sensor, a piezoelectric device, a PVDF material or a resistive strain gauge.

The present invention is also directed to an apparatus for vertical seismic profiling of an earth borehole having an x-direction, a y-direction and a z-direction orthogonal to each other. The apparatus includes an optical fiber transmission cable and a plurality of accelerometers coupled to the borehole, positioned in each of the three orthogonal directions, and in optical communication with an optical fiber transmission cable. The accelerometer is a highly sensitive linear accelerometer for sensing acceleration in a predetermined one of the directions. The accelerometer includes a rigid housing, a mass and at least two elastic support members. The elastic support members are preferably comprised of optical fiber axially aligned in the longitudinal direction and attached to the end of the housing and the mass, thereby suspending the mass together with the hinge within the housing. At least a portion of one of the elastic support members comprises a transducer capable of measuring a rotation of the mass within the housing in response to an acceleration along the predetermined direction and providing a light signal indicative of static and dynamic forces at the accelerometer location. The apparatus may also include an optical signal processor connected to the optical transmission cable providing seismic profile information based on the light signal.

DETAILED DESCRIPTION OF THE INVENTION

Figure 1:
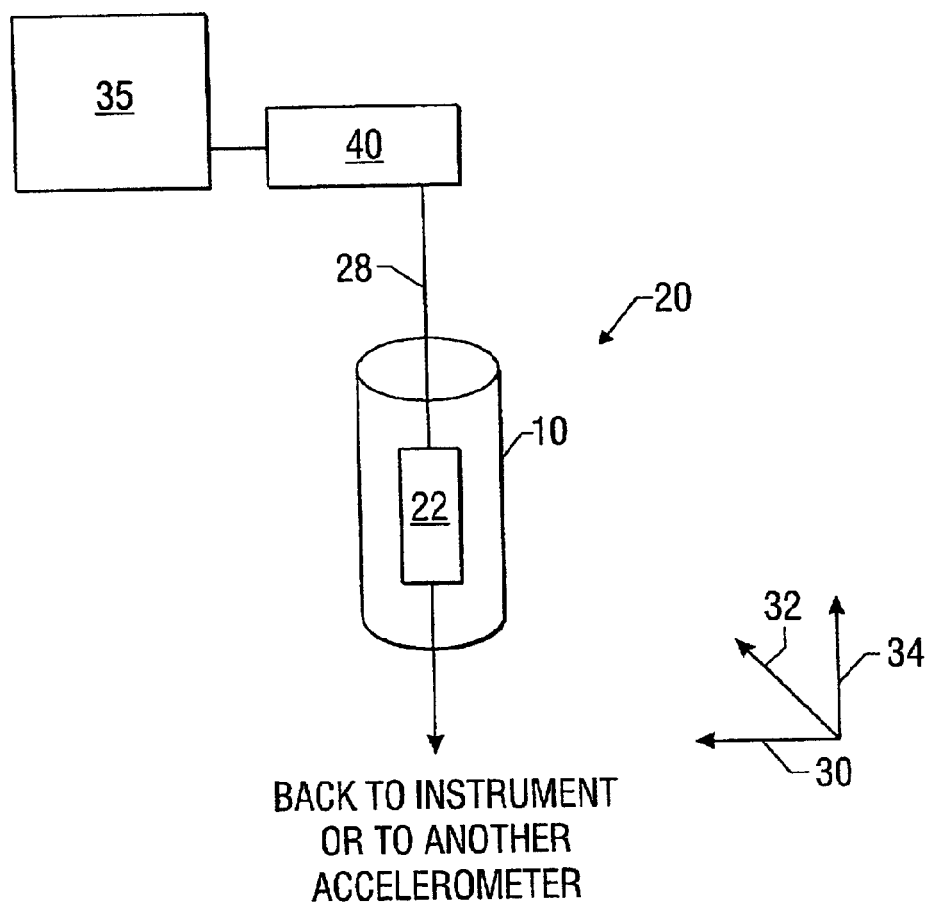
FIG. 1 is a schematic diagram of an acceleration monitoring system incorporating a highly sensitive accelerometer in accordance with the present invention.

Referring to FIG. 1, a structure 10 subjected to a hostile environment, such as an oil or gas well borehole, building, bridge, aircraft, pump or other structure or component subjected to acceleration has coupled to it at least one highly sensitive accelerometer 22. Accelerometer 22 is part of transmission cable string 20 connected by transmission cable 28 to a signal converter 40 and signal processing equipment 35. The acceleration of structure 10 in any of the three axes 30, 32, 34 is, depending on the orientation of the accelerometer, detected by accelerometer 22. Signal processing equipment 35 may comprise any known instrumentation for processing the electrical, electro-optical, or optical signal of the various embodiments of the present invention.

In one embodiment of the present invention, accelerometer 22 is mounted within a hermetically sealed vessel (not shown) and is disposed in a harsh environment. The harsh environment may have a high temperature (up to about 175 degrees C.), high pressure (up to about 20 kpsi), high EMI. The accelerometer of the present invention may also be used in any non-harsh environment where a highly sensitive accelerometer is needed. In certain embodiments, accelerometer 22 may comprise a fiber optic device and transmission cable 28 may comprise an environmentally hardened capillary tube such as that disclosed in commonly owned, co-pending U.S. patent application Ser. No. 09/121,468, entitled "Optical Fiber Cable for Use in Harsh Environments," filed Jul. 23, 1998, the disclosure of which is incorporated herein in its entirety. Transmission cable 28 is routed to accelerometer 22 and provides for the delivery of communication signals between the accelerometer and signal processing equipment 35. The accelerometer and the signal processing equipment may be connected either directly or via interface equipment (not shown) as required. The accelerometer is closely coupled to the structure by bolting, clamping or other known methods.

Figure 2:
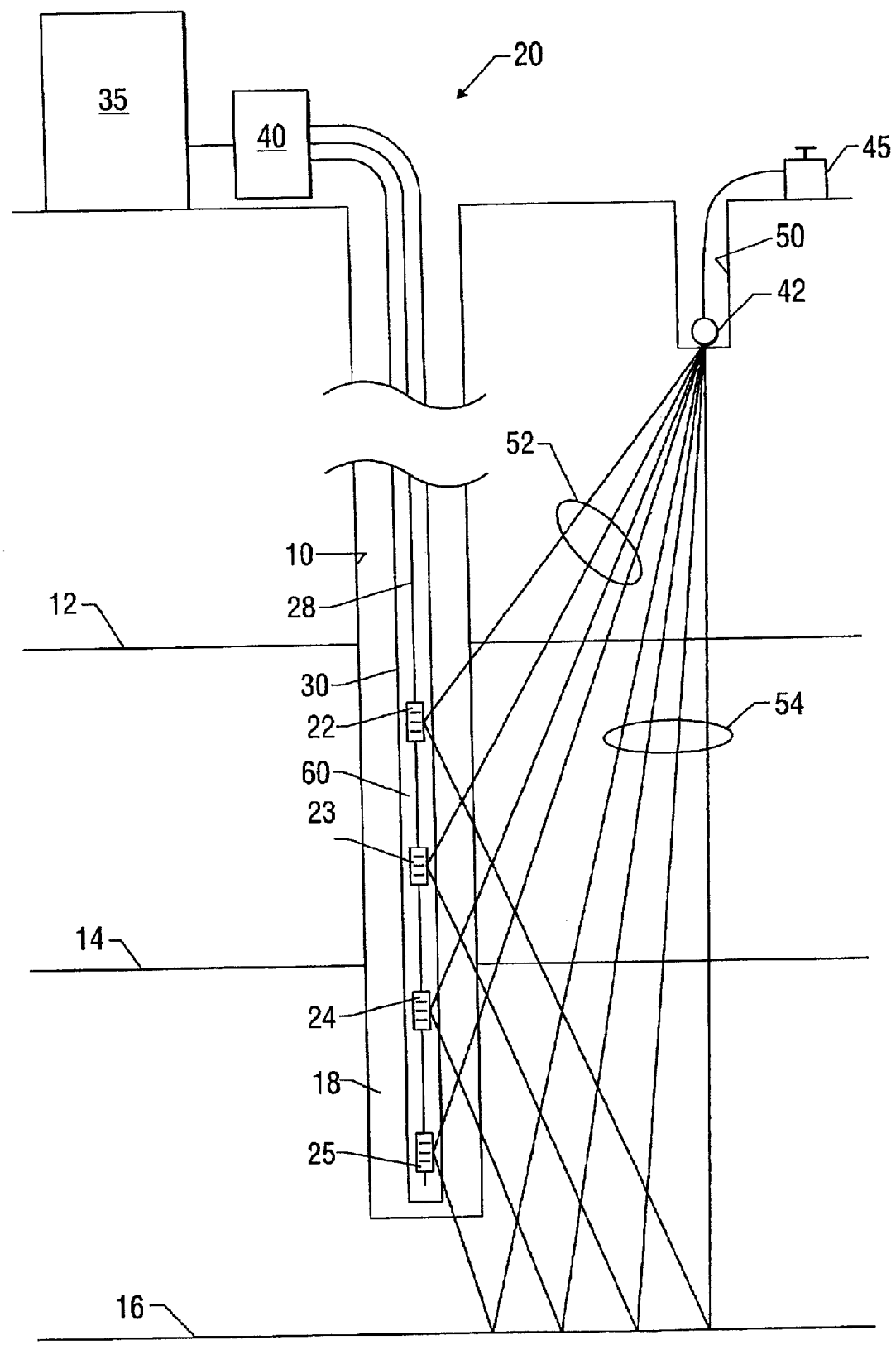
FIG. 2 is a cross-sectional view of an earth borehole having an array of accelerometers of the invention deployed therein for vertical seismic profiling.

Accelerometer 22 of the present invention may be used as a single device to monitor structure 10 directly or in an array of similar accelerometers to monitor structure 10. In one alternative embodiment, an array of accelerometers 22 may be coupled to a structure 10 to determine the structure's response to the surrounding environment. One example of such a use would be for performing vertical seismic profiling, in which the accelerometers are distributed over a known length. Referring to FIG. 2, structure 10 may be any structure, such as a casing or production pipe, coupled to a borehole within an oil or gas well, and penetrating various earth layers 12, 14, 16. Such a borehole may be fifteen to twenty thousand feet or more in depth. As is known in the art, the borehole is filled with a high temperature and pressure drilling fluid 18, which presents an extremely corrosive and hostile environment. Transmission string 20 includes an array of accelerometers 22, 23, 24, 25 connected by transmission cable 28, which may comprise an optical fiber positioned within a capillary tube. The accelerometers 22, 23, 24, 25 may comprise a single accelerometer or may comprise two or three linear accelerometers in accordance with the present invention positioned in any of the three axes 30, 32, 34 (FIG. 1). Each accelerometer transmits a light signal indicative of static and dynamic forces at the accelerometer location.

The array of accelerometers 22, 23, 24, 25 is useful for performing vertical seismic profiling, with the optical fiber sensors distributed over a known length, e.g., 5000 feet. Over the known length, the accelerometers 22, 23, 24, 25 are evenly spaced at a desired interval, e.g., every 10 to 20 feet, for providing the desired vertical seismic profiling. As described in below, each accelerometer includes fiber optic sensors that reflect a narrow wavelength band of light having a central wavelength. Each accelerometer operates at a different wavelength band and central wavelength such that the signals may be easily detected using Wavelength Division Multiplexing (WDM) techniques. The entire optical fiber, positioned within the transmission cable 28, is lowered to a desired depth, such as 1,000 feet. An acoustic wave source, such as a small charge of dynamite 42 (a seismic shot), is detonated by a blaster 45 in a shallow shothole 50 that is offset from the borehole 10 by a selected distance, e.g., 3,000 feet.

Still referring to FIG. 2, acoustic waves radiate from the shot along a direct path 52 and a reflected path 54. The reflected waves 54 are reflected off the various earth layers 12, 14, 16. The direct seismic waves 52 and reflected seismic waves 54 cause the surrounding earth layers 12, 14, 16 to react and the motion of the earth is detected by the accelerometers 22, 23, 24, 25 through structure 10 coupled to the earth. Resulting data signals are transmitted through the transmission cable 28 to the demodulator 40 and optical signal processing equipment 35. In one embodiment of the invention, after the seismic shot, the transmission cable string 20 is repositioned within the borehole for additional seismic profiling. In another embodiment of the invention, the accelerometers 22, 23, 24, 25 are distributed over the entire length of the transmission cable 28 such that the entire borehole 10 is characterized in a single shot.

In an array of accelerometers of the present invention, each accelerometer operates at a different wavelength band and central wavelength such that the signals may be easily detected using Wavelength Division Multiplexing (WDM) techniques. Signal processing equipment 35 and signal converter 40, which may comprise one or more demodulators, interpret the wavelength phase change from the return signals.

Figure 3A:
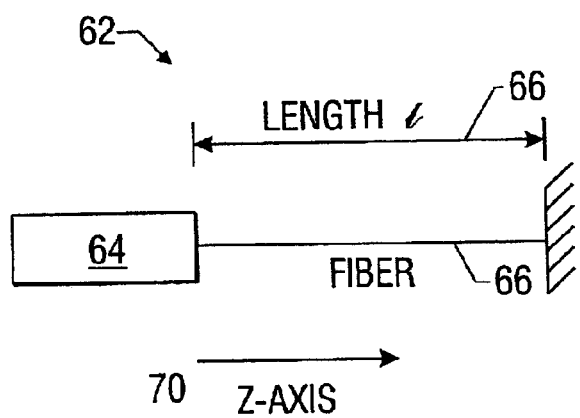
FIG. 3A is a schematic diagram of a spring mass acceleration model of the prior art.
Figure 3B:
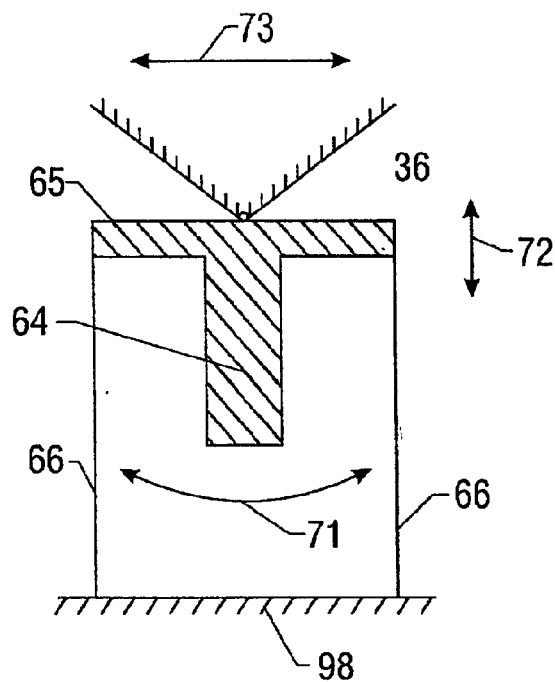
FIG. 3B is a schematic diagram of the principle for a cross axis accelerometer in accordance with the present invention.

Fiber optic detection of acceleration is based on a simple arrangement of a mass 64 straining the fiber 66 as shown in FIG. 3A. More advanced concepts have been proposed for accelerometers that have maximum sensitivity in the direction 70 of the fiber or fiber coils such as disclosed in commonly assigned U.S. Pat. No. 6,175,108, entitled, "Accelerometer Featuring Fiber Optic Bragg Grating Sensor For Providing Multiplexed Multi-Axis Acceleration Sensing," issued Jan. 16, 2001, the disclosure of which is incorporated herein in its entirety. The accelerometer of the present invention is designed to have maximum sensitivity in a direction perpendicular to the direction of the fiber coils, i.e., high cross-axis sensitivity. One advantage of such a design is miniaturization and packaging of a 3-axis sensor station. Referring now to FIG. 3B, increased cross-axis sensitivity has been obtained by disposing a hinge 36 between the housing 98 and the mass 64. Hinge 36 allows the mass 64 to rotate like a pendulum. By mounting an optical fiber 66 some distance from the hinge on arm 65, the fiber will be strained when the mass rotates. Acceleration in either direction 73 perpendicular to the fiber coils makes the housing 98 and hinge 36 move, causing the mass 64 rotate in the direction 71 stretching fiber 66 in the appropriate direction 72. The change of the fiber length can be detected by various interferometric techniques.

Figure 9:
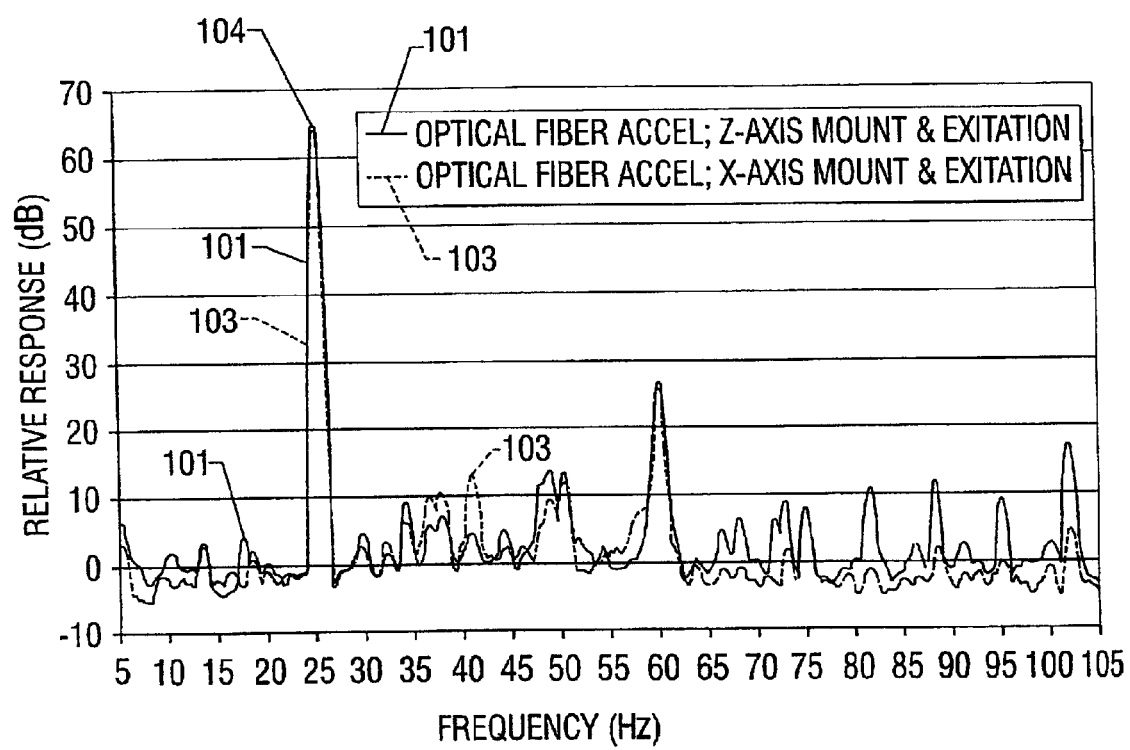
FIG. 9 is a graphical representation of the response of an embodiment of the present invention to a test signal.

A number of deficiencies of prior art accelerometers are addressed by the present invention. For instance, for fiber optic based embodiments, the lowest resolvable or measurable acceleration will be limited by the detection noise floor of the interferometer, which is configured around the optical fiber coils 80, 82 shown in FIG. 5. In seismic applications accelerometer 22 is required to detect accelerations as low as 10–100 G/rtHz. It is well known that high performance interferometers and phase measurement systems can detect phase shifts as low as 10 to 100 microad/rtHz. The optical fiber coils of an interferometer with an associated phase measurement system yield an accelerometer sensitivity or scale factor of about 1 krad/G to achieve measurements with the indicated noise floor. (FIG. 9 is an example of a typical test signal relative to the noise floor for an embodiment of the present invention).

Figure 4:
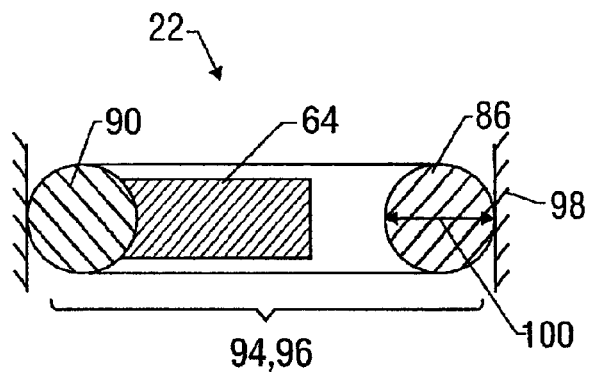
FIG. 4 is a side view of a schematic representation of an accelerometer in accordance with the present invention.
Figure 5:
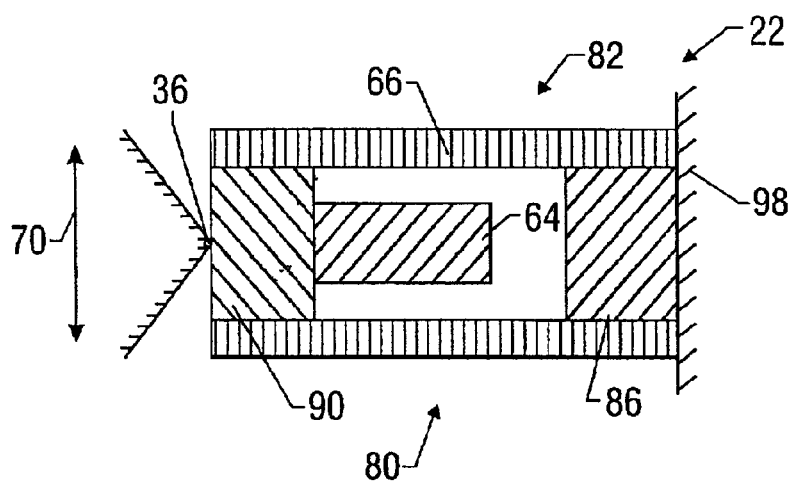
FIG. 5 is a top view of a schematic representation of an accelerometer of in accordance with the present invention.

With reference to FIGS. 4 and 5, accelerometer 22 maybe fabricated with scale factors of between 500 and 5000 krad/G, which covers the range of scale factors necessary to use this accelerometer in seismic applications. As previously noted, interferometer measurement systems exhibit scale factors that increase with increasing fiber length. The fixed mandrel 86 and floating mandrel 90 (representing the arm 65) are used to create multiple coil turns of fiber 66 in each support member, thereby enabling a small package for an accelerometer with high scale factor. In this accelerometer 22, the effective scale factor can be described in terms of the strain applied to the fiber by the rotating mass and the floating mandrel representing the arm. It is interesting to note that the scale factor will be proportional to the mass of the design and inversely proportional to the cross sectional area of the supporting fiber. The dimensions of the mass and the arms (floating mandrel) will also influence the scale factor and the resonant frequency. Normally, as the length of the fiber increases, the sensitivity increases. However, in the accelerometer of the present invention, the supporting fiber consists of a number of turns in the suspension coil.

Therefore, as the fiber length increases, the number of turns increases and the total fiber cross sectional area of the suspension bands increases. The overall effect is to make the scale factor approximately independent of total fiber length.

The range of accelerometer 22 can be limited by two factors, the first of which is the phase measurement system. If the phase measurement system has a limited range, then large accelerations cannot be interpreted. However, current phase demodulator technology, as typified by an Optiphase model OPD-200, produced and sold by Optiphase, which can track phase changes over many $2\pi$ cycles, removes this aspect as a limitation.

The other potential limitation is the mechanical strength of the fiber. The present invention has been reviewed with respect to the mechanical implications of large acceleration changes imposed on the suspension coils. It is useful to realize that even at very high shock conditions, for example as high as 200 G's, that the transient load is shared by all of the fibers in the coil. In such a situation, the maximum load applied to any filament in the coil can be much less than 10% of the ultimate strength of the glass filament. This load sharing ability is a benefit of the accelerometer of the present invention, demonstrating inherent durability and large acceleration range capability.

Figure 13:
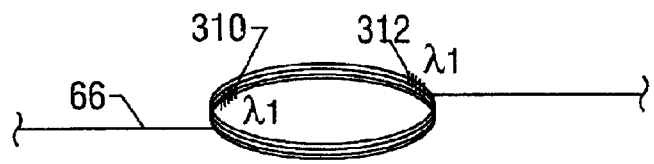
FIG. 13 is a side view of optical fiber wrap with a pair Bragg gratings within each wrap, in accordance with the present invention.
Figure 14:
FIG. 14 is a side view of optical fiber wrap interferometer, in accordance with the present invention.

A typical approach for accelerometer design is to define the operating bandwidth to be the flat signal response spectral region below the first structural resonance of the suspended mass. In the accelerometer of the present invention, the stiffness of the coils has an impact on the resonant frequency, and the total glass cross-sectional area of the coil relative to the accelerometer mass must be considered when designing the fundamental resonant frequency. The inventors have discovered that an adequate scale factor can be achieved while maintaining the system resonance above 1 kHz, which enables the present invention to satisfy many seismic transducer application requirements. Examples of both the amplitude and phase response functions of a typical device are shown in FIGS. 13 and 14, verifying the ability to achieve high resonant frequencies while achieving good sensitivity. Certain embodiments of the accelerometer of the present invention make it practically insensitive to position with respect to gravity as will be described below.

It is generally not practical to use long fiber length l in a single strand as shown in FIG. 3A. Therefore, the present invention uses multiple windings 80, 82 of fiber 66 to obtain a long effective fiber length as best shown with reference to FIGS. 4 and 5. The windings 80, 82 of fiber optic accelerometer 22 each comprise N turns of fiber 66 coiled around a fixed mandrel 86 and around a second active mandrel 90 that is mounted by a hinge and can rotate in one plane. The active mandrel 86 is fixed to the mass 64 and the rotation about hinge 36 is used to strain the fiber. The fixed mandrel 86 may be grounded to a housing 98, and the active mandrel 90 may be restrained from rotation normal to the direction represented by arrow 70. When housing 98 is subjected to motion in the cross axis direction 70 the acceleration associated with that motion causes the mass 64 and active mandrel 90 to rotate about the hinge. This movement is detected by the transducers, or sensor coils 94, 96 in a manner comparable to the mass/spring system of FIG. 3A.

Any known optical fiber having various diameters may be used; however, the fiber diameter is important to the performance, durability and reliability of the accelerometer. For example, an optical fiber having a relatively large diameter has a minimum bend radius to ensure a predictable lifetime with failure. If a large diameter fiber is used, a commensurately large mandrel diameter should be used to accommodate the fiber for reliability reasons. However, as mandrel diameter grows so too does the overall volume of accelerometer 22.

Figure 6:
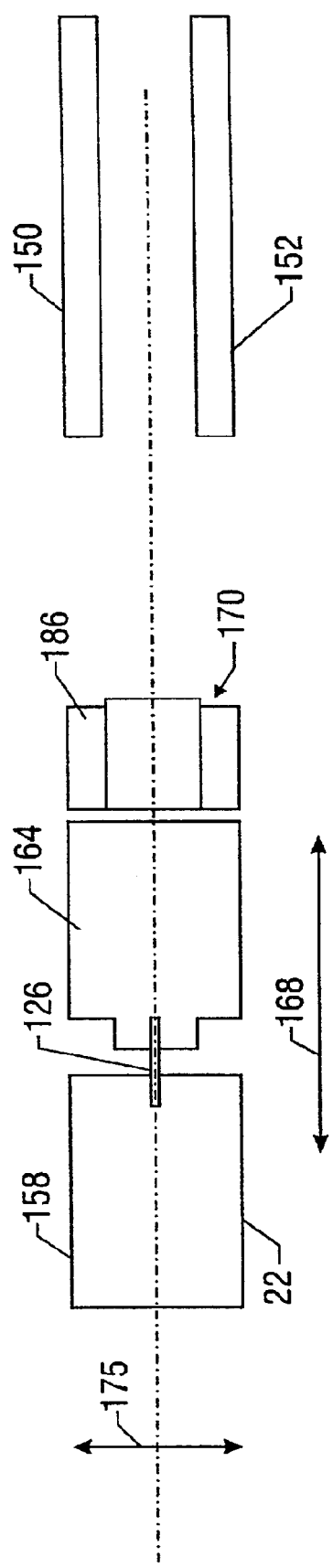
FIG. 6 is an exploded top view of an embodiment of the accelerometer of the present invention.

FIG. 6 illustrates an embodiment of an accelerometer in accordance with the present invention in exploded view. The accelerometer includes two elastic support members 150 and 152, which are comprised of windings of optical fibers, although other elastic support members could be employed without deviating from the present invention. Elastic support members 150 and 152 are comprised of the same length of fiber and cooperate with the hinge arrangement 36 to suspend mass 164 within housing 91 (FIG. 8) by the use of the hinge clamp 158. In this embodiment, hinge arrangement 36 is made by the use of a spring blade 136, although other known methods of providing for hinge 136 are contemplated within the scope of the present invention.

Figure 7:
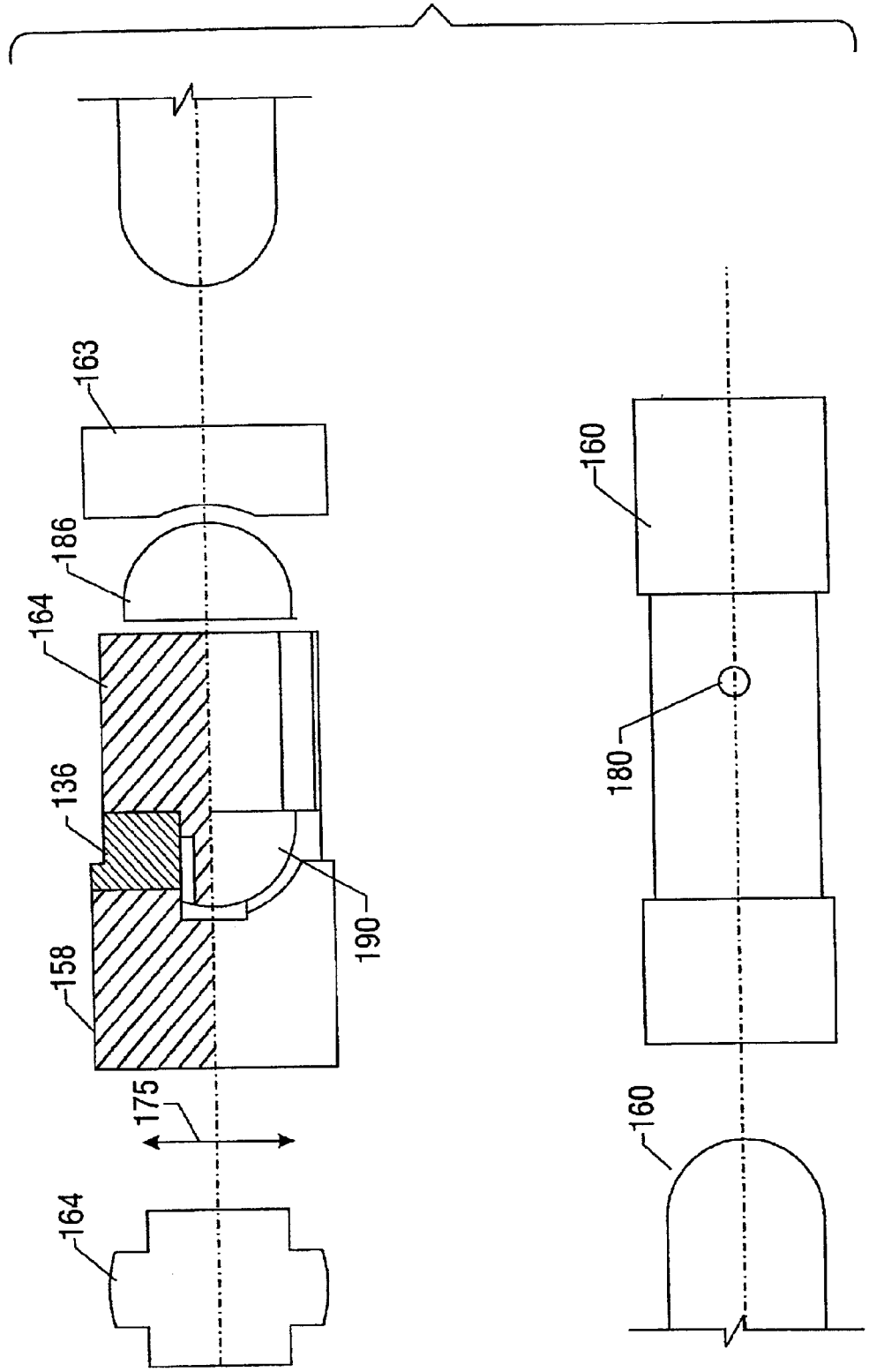
FIG. 7 is an exploded side view of the accelerometer of FIG. 6 showing the axial alignment assemblies.
Figure 8:
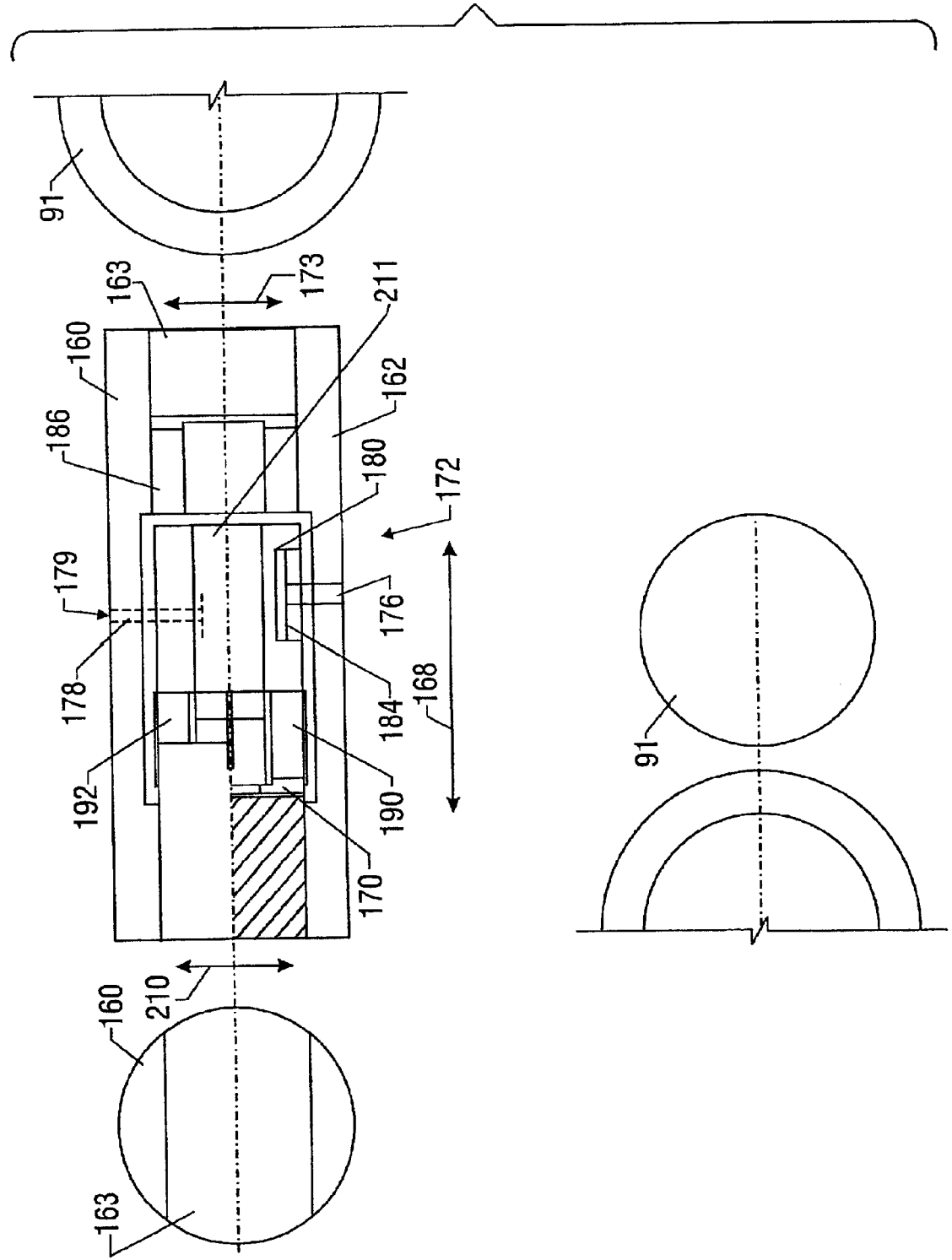
FIG. 8 is a top view of an embodiment of the accelerometer of the present invention.

The wraps of support members 150 and 152 are wound in a continuous fashion about fixed mandrel 186, which is rigidly attached to the housing 91 and mandrel end 190 of mass 164. The support members 150 and 152, are similar to sensor coil 66 described with reference to FIGS. 3 and 5. As best shown in FIG. 7, support members 150 and 152 act as springs to bias known proof mass 164 with respect to the hinge 136 and cooperate to suspend the mass within the housing. As shown in FIG. 8, the fixed mandrel 186 is positioned within the housing 91 by the use of two splints 160 and 162. Hinge clamp 158 and tube clamp 163 produce a predetermined initial bias in each of the elastic support members 150 and 152. Support members 150 and 152 are axially aligned, in the direction indicated by arrow 168, with each other, housing 91 and mass 164. Fixed mandrel 186 and mandrel end 190 include grooves 170 positioned thereon to facilitate assembly and maintain the axial positioning of the support members. Accelerometer 22 accurately detects acceleration in the direction 173 perpendicular to the direction 168 of the housing 91 and the direction 175 of the hinge.

The pendulum mass is comprised of central portion 164 and mandrel ends 190 and 192. The mass and the mandrels also represent the arm 65 in FIG. 3A generating the strain in the fiber coils 150 and 152 when the mass rotates about hinge 136. The rotation can only take place perpendicular to the small thickness of the spring blade.

Mass 164 can include alignment assemblies 172 and 174 (best shown in FIGS. 7 and 8) for limiting the movement of mass 164 perpendicular to the rotational axis 175. Alignment assemblies 172 and 174 are comprised of alignment rods 176 and 178 that slidably pass through holes 180 and 182 in the sidewalls of the splints 160 and 162 and are attached to diaphragms 184 and 186 by, for example, threaded nuts 188 and 190. Diaphragms 184 and 186 are captured within bores 192 and 194 in the mass 164 by rings installed by screws (not shown). The rings 200 cooperate with lip 202 within bores 192 and 194 to capture diaphragms 184 and 186 about their outer edges within the bore to allow for flexure of the diaphragms in the pendulum direction 173. Diaphragms 184 and 186 are comprised of a thin flexible material, e.g., metal, which is highly flexible along the axial direction 173 but is quite rigid in the plane of the diaphragms (parallel to the axial direction). This allows relatively unimpeded movement of mass 164 in the rotational direction 173, while virtually eliminating movement of the mass assembly in other directions. By limiting the movement of the mass 164 in non-pendulum directions, alignment assemblies 172 and 174 of accelerometer 22 greatly reduce cross-axis response.

In operation, housing 91 containing accelerometer 22 may be mounted to a structure, such as an oil production tube 10 (FIG. 2), by rigid attachment using bolting, welding or other known methods of attachment. As the structure experiences acceleration due to changes in direction or velocity, mass 164 will rotate in the pendulum direction 173 within housing 91 in a magnitude related to the acceleration of the structure in the sensing direction. Elastic support members 150 and 152 will respond by elongating or relaxing, the action of which will lengthen or shorten the optical fibers and produce a signal corresponding to the acceleration. For example, when the structure is accelerated in the direction indicated by arrow 210 (FIG. 8) mass 164 will rotate within the housing in the direction opposite that indicated by arrow 211. The tension in support member 150 will increase (increasing the fiber length), and the tension in support members 152 will decrease (decreasing the fiber length). The change in phase angle of the light within the fibers caused by the change in length of the fibers, as interpreted by the processing equipment 35 (FIG. 1), corresponds to a known acceleration level. The support members are independent coil systems, and their output can be a single coil in a sensor leg of an interferometer. Other methods of determining a corresponding change in length of the support members are included in the present invention and are more fully described below With reference again to FIG. 8, accelerometer 22 is small enough to fit within a tube 91, having end caps 93 for use in sealing and protecting the device from the environment. Tube 91, in one embodiment, is comprised of Inconel material and has outside dimensions of approximately one inch in diameter and approximately 3.5 inches in length. At least one of end caps 93 further includes an exit hole 97 including any known sealing feature for routing the transmission cable 28 (FIG. 1) from the housing. The mandrel diameters 100 are approximately 11–13 mm and the distance between fixed mandrel 186 and floating mandrels 190 and 192 is in the range 4–10 mm in a zero-g state. Mass 164 is comprised of a metallic material and is on the order of 30–60 grams. Support members 150 and 152 are comprised of an 80 micron optical fiber and a total length of between about 10 m and about 20 m, with the number of wraps varying from about 40 to about 100. The housing 91, mass 164 and mandrels may all be comprised of metal materials. In embodiments where the support members are comprised of optical fibers, the use of an all-metal configuration with glass fibers yields an extremely stable and reliable accelerometer 22, even at elevated temperatures.

Figure 12:
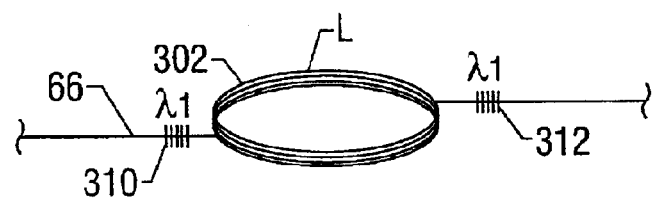
FIG. 12 is a side view of an elastic support member comprising an optical fiber wrap having a pair of Bragg gratings around each optical wrap, in accordance with the present invention.

The performance of an accelerometer in accordance with the present invention is approximated in FIG. 12, which shows a plot of the relative response of the accelerometer to an excitation force on a calibration test shaker. The test shaker set up is known in the industry and is comprised of standard input and output components as well as a known reference accelerometer. The specific accelerometer 22 was designed to operate with a bandwidth from about 5 Hz up to about 500 Hz. The accelerometer of the present invention was subjected to a test signal of approximately 126 $\mu$g in the axial direction 173 at a frequency of 25 Hz. Line 101 represents the performance of accelerometer 22 when the excitation was along the axis 173. Line 101 indicates an extremely sensitive 65 dB signal to noise ratio response represented by point 104 at the 25 Hz test signal frequency with very little spurious response on either side of the test signal. Similarly, line 103 represents the performance of accelerometer 22 when the axial direction and the test force are parallel to the longitudinal axis (represented by arrow 168 in FIG. 1) and the same 25 Hz test signal. Line 103 shows an almost exact level of response at the test signal frequency of 25 Hz. In addition, the orientation of the accelerometer did not adversely affect the relatively low spurious signals on either side of the test signal. The relatively low noise is further demonstrated in the figure with the largest such peak being less than 28 db at 60 Hz. The 60 Hz signal is due to ground loops in the calibration system and is not considered an accelerometer error signal. Such signals, once their cause is identified, can in most instances be isolated and eliminated. It is an important feature of the present invention that orientation of the accelerometer with respect to gravity has little effect on its performance. Therefore, arrays of accelerometers 22 in the three orthogonal directions 30, 32, 34 (FIG. 2) can be used to measure the vector directions of detected seismic waves.

Figure 10:
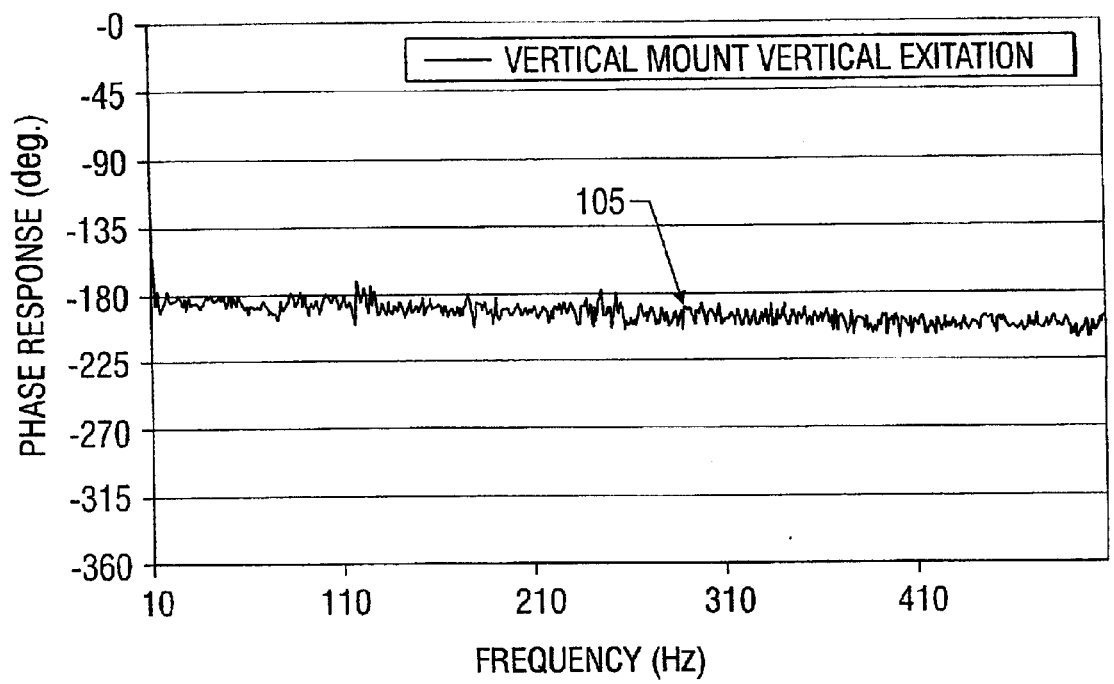
FIG. 10 is a graphical representation of the phase response of the embodiment of FIG. 9.
Figure 11:
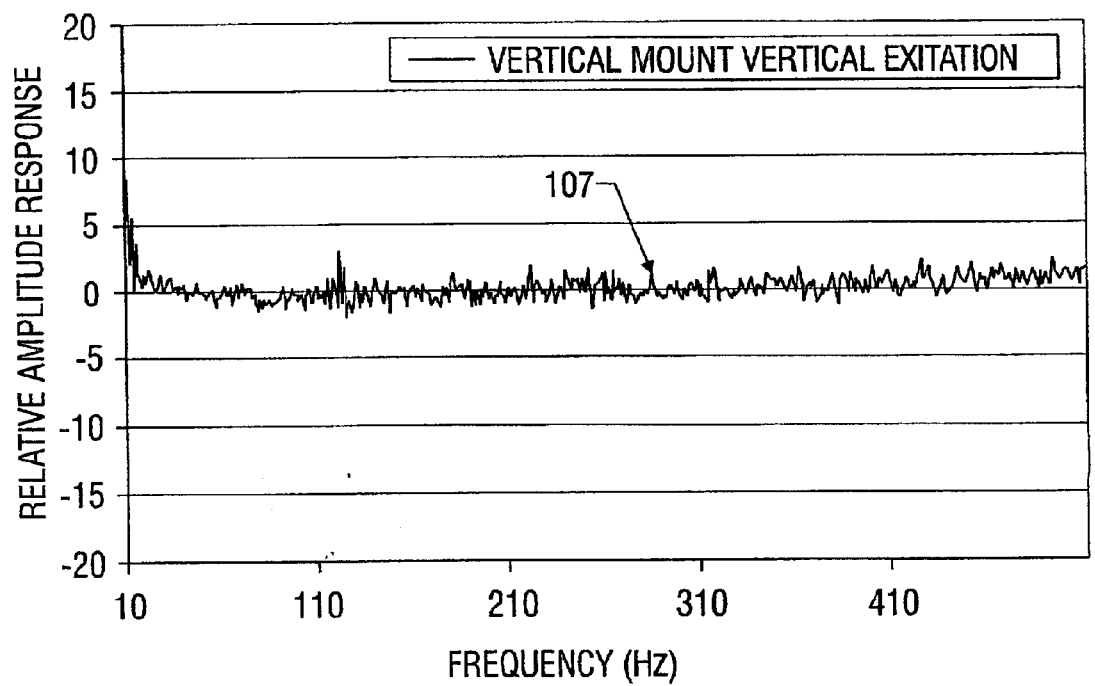
FIG. 11 is a graphical representation of the amplitude response of the embodiment of FIG. 9.

Referring to FIGS. 13 and 14, the bandwidth of the accelerometer is shown. The accelerometer was tested as described above, and the phase and amplitude response were checked against the reference accelerometer. The phase response represented by line 105 in FIG. 10 is relatively flat, which demonstrates that the accelerometer is operating well away from the resonant frequency of the device. Line 105 further shows the accelerometer lacks spurious signals within the bandwidth that could otherwise result in errors within the desired operating bandwidth. Likewise, the relative amplitude response represented by line 107 in FIG. 11 is relatively flat and free of spurious signals. This further demonstrates that the accelerometer 22 is operating well away from the resonant frequency of the device and behaves predictably in the frequency range of 5 Hz to 500 Hz.

In an embodiment of the present invention that utilizes fiber optics as the elastic support members, they may be connected individually or may be multiplexed along one or more optical fibers using wavelength division multiplexing (WDM), time division multiplexing (TDM), or any other optical multiplexing techniques (discussed below).

Referring to FIG. 12 the support member comprising a wrap 302, may have a pair of gratings 310 and 312 on opposite ends of the wrap 302. The wrap 302 with the gratings 310 and 312 may be configured in numerous known ways to precisely measure the fiber length L or change in fiber length ΔL. Such measurement configurations include interferometric, Fabry-Perot, time-of-flight, and other known arrangements. An example of a Fabry-Perot technique is described in U.S. Pat. No. 4,950,883, entitled "Fiber Optic Sensor Arrangement Having Reflective Gratings Responsive to Particular Wavelengths". One example of time-of-flight (or Time-Division-Multiplexing; TDM) would be where an optical pulse having a wavelength is launched down the fiber 66 and a series of optical pulses are reflected back along the fiber 66. The length of each wrap can, at any point in time, then be determined by the time delay between each return pulse.

Alternatively, all or a portion of the fiber may be doped with a rare earth dopant (such as erbium) to create a tunable fiber laser, such as that described in U.S. Pat. No. 5,317,576, entitled "Continuously Tunable Single Mode Rare-Earth Doped Laser Arrangement", or U.S. Pat. No. 5,513,913, entitled "Active Multipoint Fiber Laser Sensor", or U.S. Pat. No. 5,564,832, entitled "Birefringent Active Fiber Laser Sensor", which are incorporated herein by reference.

Figure 16:
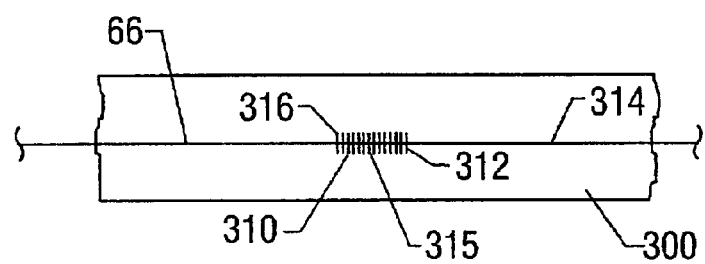
FIG. 16 is a top view in partial section of an alternative geometry of an elastic support member having an optical fiber with a pair of Bragg gratings, in accordance with the present invention.
Figure 17:
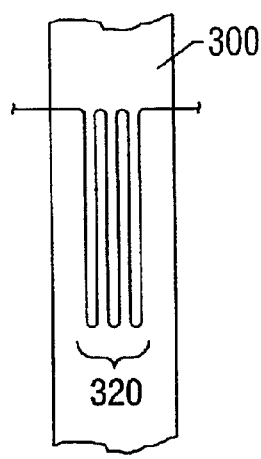
FIG. 17 is a top view in partial section of an elastic support member having an alternative geometry optical fiber in the form of a radiator coil.

Referring to FIG. 16, another type of tunable fiber laser that may be used in an accelerometer according to the present invention is a tunable distributed feedback (DFB) fiber laser, such as that described in V. C. Lauridsen, et al, "Design of DFB Fiber Lasers", Electronic Letters, Oct. 15, 1998, Vol.34, No. 21, pp 2028–2030; P. Varming, et al, "Erbium Doped Fiber DGB Laser With Permanent π/2 Phase-Shift Induced by UV Post-Processing", IOOC'95, Tech. Digest, Vol. 5, PD1–3, 1995; U.S. Pat. No. 5,771,251, entitled "Optical Fibre Distributed Feedback Laser"; U.S. Pat. No. 5,511,083, entitled "Polarized Fiber Laser Source". In that case, a grating 316 is written in a rare-earth doped fiber and configured to have a phase shift of $\lambda/2$ (where $\lambda$ is the lasing wavelength) at a predetermined location 318 near the center of the grating 316. This provides a well-defined resonance condition that may be continuously tuned in single longitudinal mode operation without mode hopping. Alternatively, instead of a single grating, the two gratings 310 and 312 may be placed close enough to form a cavity having a length of $(N+\frac{1}{2})\lambda$, where N is an integer (including 0) and the gratings 310 and 312 are in rare-earth doped fiber.

Referring to FIG. 13, instead of positioning the gratings 310 and 312 outside the wrap 302, they may be placed along the wrap 302. In that case, the grating reflection wavelength may vary with acceleration changes. Such variation may be desired for certain configurations (e.g., fiber lasers) or may be compensated for in the optical signal instrumentation 35 (FIG. 1), e.g., by allowing for a predetermined range in reflection wavelength shift for each pair of gratings.

Alternatively, instead of each wrap being connected in series, they may be connected in parallel, e.g., by using optical couplers (not shown) prior to each of the wraps, each coupled to the common fiber 66.

Referring to FIG. 14, the accelerometer 22 may also be formed as a purely interferometric sensor by wrapping the mandrels with the wrap 302 without using Bragg gratings where each wrap has a separate fiber 66. In this embodiment, known interferometric techniques may be used to determine the length or change in length of the fiber 66 between the mandrels due to movement of the mass 156. Interferometric techniques that may be used include the Mach-Zehnder or Michaelson Interferometric techniques, such as are described in U.S. Pat. No. 5,218,197, entitled "Method and Apparatus for the Non-invasive Measurement of Pressure Inside Pipes Using a Fiber Optic Interferometer Sensor." The interferometric wraps may be multiplexed as is described in Dandridge, et al, "Fiber Optic Sensors for Navy Applications", IEEE, February 1991, or Dandridge, et al, "Multiplexed Interferometric Fiber Sensor Arrays", SPIE, Vol. 1586, 1991, pp 176–183. Other techniques to determine the change in fiber length may be used. Also, reference optical coils (not shown) may be used for certain interferometric approaches and may also be located in or around the accelerometer 22. These reference optical coils may be designed to be insensitive to axial accelerations.

Also, for any geometry of the wraps described herein, more than one layer of fiber may be used depending on the overall fiber length desired. The wrap 302 may also comprise the optical fiber 66 disposed in a helical pattern (not shown) about the mandrels. Other geometries for the wraps may also be used if desired. The desired axial length of any particular wrap is set depending on the characteristics of the ac sensitivity and other parameters to be measured, e.g., the magnitude of the acceleration.

Figure 18:
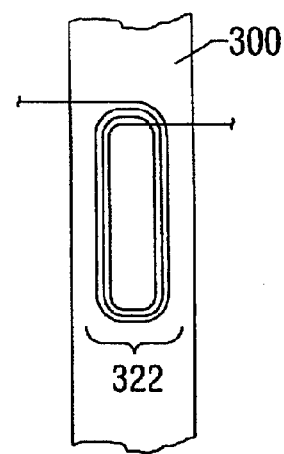
FIG. 18 is a top view in partial section of an elastic support member having an alternative geometry optical fiber in the form of a racetrack.
Figure 19:
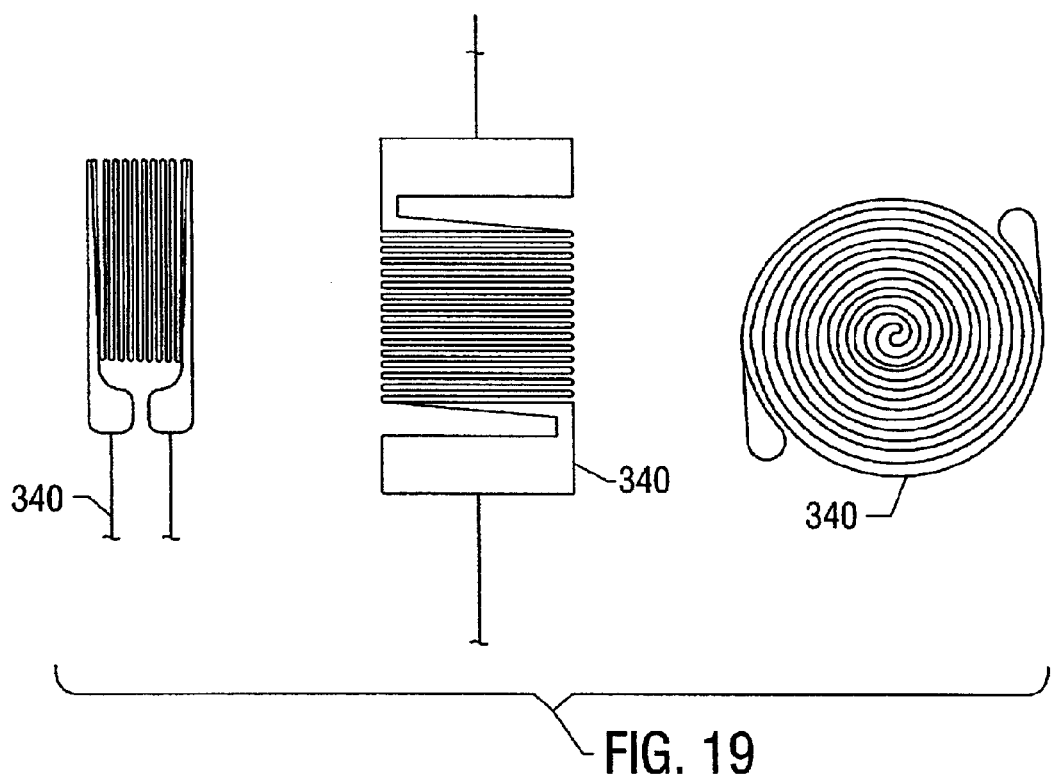
FIG. 19 is a top view of three alternative strain gauges, in accordance with the present invention.

Referring to FIGS. 18 and 19, embodiments of the present invention include configurations wherein instead of using wrap 302, fiber 66 may be disposed on or within an elastic member 300 similar to those described above. In that case, the fiber may have shorter sections 314 that are disposed on the elastic support members that optically detect strain in the members. The orientation of the strain-sensing element will vary the sensitivity to strain on the member caused by acceleration.

Figure 20:
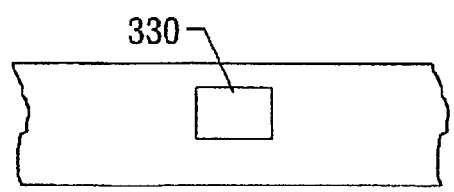
FIG. 20 is a top view in partial section of an elastic support member showing a strain gauge.

Referring to FIGS. 20 and 21, the optical strain sensor 320 or 322 on the support member 300 may have a longer length with various alternative geometries, e.g., a "radiator coil" geometry 320 (FIG. 20) or a "race-track" geometry 322 (FIG. 18). Either such geometry would be disposed along the support member to measure strain. In these embodiments, the length will be set long enough to optically detect the changes to the strain on the elastic member and thereby the acceleration.

Figure 15:
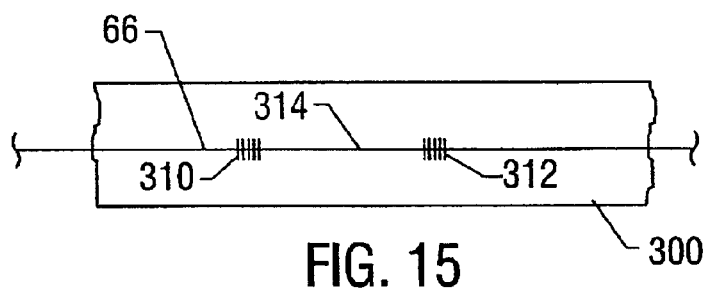
FIG. 15 is a top view in partial section of an elastic support member having an optical fiber with a pair of Bragg gratings, in accordance with the present invention.

Referring to FIG. 15, the pairs of Bragg gratings (310 and 312) may be located along the fiber 66 with at least a section 314 of the fiber 66 between each of the grating pairs located on the elastic members 300. In that case, known Fabry-Perot, interferometric, time-of-flight or fiber laser sensing techniques may be used to measure the change in length of at least a section of the elastic support member 300, in a manner similar to that described in the aforementioned references.

Alternatively, the gratings 310 and 312 may be individually disposed on the support members 300 and used to sense the strain on the members (and thus displacement of the mass 156). When a single grating is used on the support member, the grating reflection wavelength shift will be indicative of changes in strain on the member.

Any other technique or configuration for an optical strain gauge may also be used. The type of optical strain gauge technique and optical signal analysis approach is not critical to the present invention, and the scope of the invention is not intended to be limited to any particular technique or approach.

For any of the embodiments described herein, the strain sensors may be attached to the elastic support members by adhesive, glue, epoxy, tape or other attachment means that ensures suitable contact between the strain sensor and the elastic member. The strain gauges, optical fibers or sensors may alternatively be removable or permanently attached via known mechanical techniques such as mechanical fasteners, springs, clamps, clamshell arrangements, straps or other equivalents. Alternatively, the strain gauges, including optical fibers and/or gratings, may be embedded in the elastic members. In addition, for any of the embodiments described herein, the support member may also comprise any strain sensitive material, such as a PVDF.

Referring to FIGS. 22, 23 it is also within the scope of the present invention to use any other strain sensing technique to measure the variations in strain on the elastic member. Other strain sensing techniques that may be used include highly sensitive piezoelectric, electronic or electric strain gauges attached to or embedded in the elastic support members. Referring to FIG. 19, different known configurations of highly sensitive piezoelectric strain gauges are shown comprising foil-type gauges 340. Referring to FIG. 20, an embodiment of the present invention is shown wherein the strain sensors comprise strain gauges 330. In this particular embodiment, strain gages 340 are disposed about a predetermined portion of the elastic member 300.

It should be understood that any of the embodiments described herein may comprise elastic support members in the form of discrete strips of material that are merely attached to the housing 158 and the mass 156 by any known method. It should be further understood that although description of the embodiments has been given with reference to the mass 156 moving, it is within the scope of the present invention that the housing 158 may move and the mass remain stationary. It is merely necessary that relative motion between the two features be detected by the change in length of the support member.

It should be understood that, unless otherwise stated herein, any of the features, characteristics, alternatives or modifications described regarding a particular embodiment herein may also be applied, used, or incorporated with any other embodiment described herein. Additionally, the drawings shown herein are not drawn to scale.

Additionally, it is possible to construct the accelerometer so that a single accelerometer is capable of measuring acceleration in two directions perpendicular to the longitudinal axis of the housing. Such a sensor would be constructed so that there were at least two elastic support mechanisms, e.g., optical fibers, arranged to suspend the weight with a known angular relationship therebetween. The mass would be pivotally connected to the housing such that it could swing in any direction. By measuring the strain in two of the fibers with a known angular relationship therebetween, the magnitude and direction of the acceleration can be determined.

Although the invention has been described and illustrated with respect to exemplary embodiments thereof, the foregoing and various other additions and omissions may be made therein and thereto without departing from the spirit and scope of the present invention.

What is claimed is:

1. A highly sensitive accelerometer for sensing acceleration in a direction perpendicular to a longitudinal axis of the sensor, the accelerometer comprising:
   a rigid housing;
   a mass pivotally attached to the housing;
   an elastic support member aligned along the longitudinal axis and suspending the mass within the housing;
   wherein at least a portion of the elastic support member comprises a transducer configured to measure a displacement of the mass within the housing in response to an acceleration along the direction.

2. The accelerometer of claim 1 further comprising a fixed mandrel rigidly attached to the housing wherein:
   the mass comprises a floating mandrel; and
   the elastic support member is wrapped about the fixed mandrel and the floating mandrel.

3. The accelerometer of claim 2 wherein the floating mandrel is pivotally connected to the housing by a hinge.

4. The accelerometer of claim 3 wherein the floating mandrel rotates about the hinge due to the acceleration to be sensed.

5. The accelerometer of claim 1 wherein the elastic support member comprises an optical fiber coil.

6. The accelerometer of claim 5 wherein movement of the mass induces in the fiber a corresponding variation in length of the optical fiber coil.

7. The accelerometer of claim 6 wherein the variation in the length is measured interferometrically.

8. The accelerometer of claim 1 further comprising an alignment assembly substantially preventing movement of the mass in a direction perpendicular to the direction of the sensed acceleration.

9. The accelerometer of claim 8 wherein the alignment assembly comprises a flexure member attached to the mass and the housing allowing movement of the mass in the direction of the sensed acceleration.

10. The accelerometer of claim 8 wherein the alignment assembly comprises a diaphragm.

11. The accelerometer of claim 10 wherein the alignment assembly comprises:
    a pair of diaphragms each disposed on an end of an alignment rod; and
    a bore positioned in each side of the housing, wherein the diaphragms are captured within the bore about the periphery of the diaphragms.

12. The accelerometer of claim 1 wherein the transducer comprises a strain gauge.

13. The accelerometer of claim 12 wherein the strain gauge is selected from the group consisting of: a fiber optic sensor, a piezoelectric device, a PVDF material and a resistive strain gauge.

14. The accelerometer of claim 12 wherein the transducer is a fiber optic Bragg grating.

15. A highly sensitive accelerometer for sensing acceleration in a direction perpendicular to the longitudinal axis of the sensor, the accelerometer comprising:
    a rigid housing;
    a mass pivotally attached to the housing;
    a fixed mandrel attached to the housing;
    at least one elastic support member axially aligned in the housing and wrapped around the fixed mandrel and the mass, the support member comprising a means for measuring rotation of the mass within the housing in response to an acceleration perpendicular to the longitudinal axis of the sensor.

16. The accelerometer of claim 15 further comprising at least one alignment means for substantially preventing movement of the mass in a direction perpendicular to the direction of the sensed acceleration.

17. The accelerometer of claim 15 wherein the floating mandrel is pivotally connected to the housing by a hinge.

18. The accelerometer of claim 15 wherein the means for measuring rotation comprises a means for measuring a change of length of the elastic support member.

19. The accelerometer of claim 18 wherein the means for measuring rotation comprises a means for interferometrically measuring a change of length of the elastic support member.

20. An apparatus for vertical seismic profiling comprising:
    an optical fiber transmission cable; and
    a plurality of accelerometers coupled to the earth and in optical communication with the optical fiber transmission cable and positioned in at least two orthogonal directions, each the linear accelerometer comprising:
    a rigid housing;
    a mass pivotally attached to the housing;
    an elastic support member aligned along the longitudinal axis of the sensor and suspending the mass within the housing;
    wherein at least a portion of the elastic support member comprises a transducer configured to measure displacement of the mass within the housing in response to an acceleration along a direction perpendicular to said longitudinal axis and to provide a light signal indicative of static and dynamic forces at an accelerometer location.

21. The apparatus of claim 20 further comprising an optical signal processor connected to the optical transmission cable providing seismic profile information based on the light signal.

22. The apparatus of claim 20 further comprising an array of the linear accelerometers coupled to the earth at a plurality of predetermined positions.

23. The apparatus of claim 20 wherein the plurality of accelerometers are coupled to the earth via an oil well casing, a bore hole, or an oil production tube.

24. The apparatus of claim 20 further comprising a fixed mandrel rigidly attached to the housing wherein:

the mass comprises a floating mandrel; and the elastic support member is wrapped about the fixed mandrel and the floating mandrel.

25. The apparatus of claim 24 wherein the floating mandrel is pivotally connected to the housing by a hinge.

26. The apparatus of claim 25 wherein the floating mandrel rotates about the hinge due to the acceleration to be sensed.

27. The apparatus of claim 20 wherein the elastic support member comprises an optical fiber coil.

28. The apparatus of claim 27 wherein movement of the mass induces in the fiber a corresponding variation in length of the optical fiber coil.

29. The apparatus of claim 28 wherein the variation in length is measured interferometrically.

30. The apparatus of claim 20 wherein each accelerometer further comprises an alignment assembly substantially preventing movement of the mass in a direction perpendicular to the direction of the sensed acceleration.

31. The apparatus of claim 30 wherein the alignment assembly comprises a flexure member attached to the mass and the housing allowing movement of the mass in the direction of the sensed acceleration.

32. The apparatus of claim 30 wherein the alignment assembly comprises a diaphragm.

33. The apparatus of claim 32 wherein the alignment assembly comprises:

a pair of diaphragms each disposed on an end of an alignment rod; and a bore positioned in each side of the housing, wherein the diaphragms are captured within the bore about a periphery of the diaphragms.

34. The apparatus of claim 20 wherein the transducer comprises a strain gauge.

35. The apparatus of claim 34 wherein the strain gauge is selected from the group consisting of: a fiber optic sensor, a piezoelectric device, a PVDF material and a resistive strain gauge.

36. The apparatus of claim 34 wherein the transducer is a fiber optic Bragg grating.

37. A method of detecting acceleration comprising:

providing a rigid housing having a mass disposed within the housing which is pivotally attached to the housing;

providing an elastic support member aligned with a longitudinal axis of the rigid housing and connected to the housing and the mass;

measuring a change in the length of the elastic support member caused by rotational displacement of the mass, the rotational displacement induced by an acceleration of the rigid housing in a direction orthogonal to the longitudinal axis.

38. The method of claim 37 wherein the elastic support member comprises an optical fiber.

39. The method of claim 38 wherein the measuring is performed interferometrically.

40. The method of claim 38 wherein the optical fiber further comprises a Bragg grating.

41. The method of claim 37 further comprising substantially preventing movement of the mass in a direction perpendicular to the predetermined direction.

* * * * *